(12) United States Patent
Kirsch et al.

(10) Patent No.: US 12,501,380 B2
(45) Date of Patent: Dec. 16, 2025

(54) TACTICAL RADIO SATELLITE COMMUNICATIONS TIMING

(71) Applicant: L3Harris Technologies, Inc., Melbourne, FL (US)

(72) Inventors: James C. Kirsch, San Diego, CA (US); Thomas J. Allen, Oceanside, CA (US); Jon E. Stearn, Carlsbad, CA (US)

(73) Assignee: L3Harris Technologies, Inc., Melbourne, FL (US)

( * ) Notice: Subject to any disclaimer, the term of this patent is extended or adjusted under 35 U.S.C. 154(b) by 337 days.

(21) Appl. No.: 18/243,576

(22) Filed: Sep. 7, 2023

(65) Prior Publication Data

US 2024/0236881 A1 Jul. 11, 2024

Related U.S. Application Data

(60) Provisional application No. 63/408,413, filed on Sep. 20, 2022.

(51) Int. Cl.
*H04W 56/00* (2009.01)
*H04B 1/7156* (2011.01)
*H04W 84/06* (2009.01)

(52) U.S. Cl.
CPC ........ *H04W 56/001* (2013.01); *H04B 1/7156* (2013.01); *H04W 56/0045* (2013.01); *H04B 2001/71566* (2013.01); *H04W 84/06* (2013.01)

(58) Field of Classification Search
CPC .................................................. H04W 56/001
See application file for complete search history.

(56) References Cited

U.S. PATENT DOCUMENTS

2025/0048313 A1\* 2/2025 Yoshioka .............. H04W 56/00

\* cited by examiner

*Primary Examiner* — Pamit Kaur
(74) *Attorney, Agent, or Firm* — Fox Rothschild LLP; Carol E. Thorstad-Forsyth

(57) ABSTRACT

A method of communicating using a tactical radio in a space vehicle environment. The method includes identifying a relationship between a space vehicle and an area of responsibility. Based on the relationship between the space vehicle and the area of responsibility, the method further includes determining a clock offset. The method further includes applying the clock offset to a system clock. The method further includes using the clock offset applied to the system clock to perform communications between the space vehicle and an entity in the area of responsibility.

20 Claims, 4 Drawing Sheets

TACTICAL RADIO SATELLITE COMMUNICATIONS TIMING

CROSS-REFERENCE TO RELATED APPLICATIONS

This application claims the benefit of and priority to U.S. Provisional Patent Application Ser. No. 63/408,413 filed on Sep. 20, 2023, and entitled "LINK-16 RADIO LEO COMMUNICATIONS TIMING," and which application is expressly incorporated herein by reference in its entirety.

BACKGROUND

Background and Relevant Art

Link 16 is a tactical data link network used by certain permitted nation state entities. Using Link 16, various military vehicles, personnel, and other entities can exchange tactical pictures in near real-time. Link 16 supports exchanging information including textual messages, images, and various different qualities of voice data. The information can include various combinations of the various types of information.

Link 16 is high speed with multiple data channels. This is accomplished using time division multiple access (TDMA) communications. Link 16 is jam resistant, detection resistant, and interception resistant. This is accomplished by Link 16 being implemented using a frequency division multiple access (FDMA) scheme which implements frequency hopping spread spectrum (FHSS).

Currently, due to the TDMA timing limits and the FHSS constraints, Link 16 is limited in range to about 300 nautical miles in Normal Range mode or 500 nautical miles in Extended Range mode. This restricts its use in a fashion such that satellites and other space vehicles are not able to use Link 16 for communications. Communications traveling 300 nautical miles take approximately 1.8 ms. Network time in Link 16 is comprised of time intervals referred to as epochs. Each epoch is 12.8 minutes long. Each epoch is divided into time slots that are each 7.8125 milliseconds wide. Frequency hopping, using the FDMA scheme, occurs every 7.8125 ms (i.e., at 128 Hz). The FDMA scheme hops between a series of 51 pseudo random selections of frequencies.

Before deployment, predetermined time slot assignments are loaded into Link 16 terminals to be deployed. The time slot assignments repeat for each epoch, and instruct each terminal with respect to radio frequency, message coding, and a mode of operation for the terminal during each time slot. The modes of operation include transmit, receive, or relay, and are defined for the duration of a given slot. The time slot assignments include identification of each slot, set values that define the first slot in the epoch, and the action recurrence rate defining how often an action assigned to the terminal for a given time slot repeats until the end of the epoch. All terminals participating in a Link 16 network use a common network time reference to communicate intelligible messages during their assigned time slots.

In typical configurations, outside terminal desiring to enter an active Link 16 network first detects an initial entry message and thereafter synchronizes its current time with the network time. The initial entry message may be received from a network time reference terminal that maintains the authoritative clock for the network or from another user terminal that has been initialized to transmit initial entry messages.

In response to an internal network entry command at a terminal, the terminal uses its internal current time at the terminal as its initial time estimate for network time. The terminal adds an error estimate to its current time to obtain a time error window. The terminal then calculates when an initial entry message should occur after the end of the error window. The terminal then sets communication hardware acting as a receiver to match the frequency and coding assigned to a time slot existing when the initial entry message should be received. The receiver communication hardware listens for the initial entry message. If no initial entry message is detected, the terminal resets the receiver communication hardware to match the frequency and spreader code assigned to the time slot in which a subsequent initial entry message should be received. As a result of detecting an initial entry message, the terminal uses the time slot in which the message was received to reset the terminal's current time reference and continues to increment the reset time forward.

However, if two terminals, in the time-synched network, attempting to communicate are outside of the 300 nautical mile range, latency of transmitted messages and received messages results in transmitter communication hardware and receiver communication hardware in different terminals having their frequencies and codes set in such a way that the terminals cannot effectively communicate. For example, a transmitter terminal may transmit a message using a first frequency and first code to a receiver terminal. The receiver terminal has receiver hardware set for the first frequency and first code when the message was sent from the transmitter terminal, but due to the delay, due to a distance between the two nodes, the receiver node will have changed its receiver communication hardware to a different second frequency and code before the message arrives, and thus, will not be able to receive the message. It would therefore be useful to implement systems where communications can, nonetheless, occur beyond certain distances.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method of communicating using a tactical radio in a space vehicle environment. The method includes identifying a relationship between a space vehicle and an area of responsibility. Based on the relationship between the space vehicle and the area of responsibility, the method further includes determining a clock offset. The method further includes applying the clock offset to a system clock. The method further includes using the clock offset applied to the system clock to perform communications between the space vehicle and an entity in the area of responsibility.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein include methods and systems with modified communication timing of a modified communication terminal allowing the modified communication terminal to communicate with conventional communication terminals at distances greater than previously attainable by certain tactical data link networks, such as Link 16. In a typical example, the modified communication terminal is a satellite and the conventional communication terminal is a ground based terminal.

In some examples, the modified communication terminal maintains a clock offset value that is applied to a current network clock value of a network clock at the modified communication terminal, where the network clock keeps track of a common network time used by the various terminals in a given tactical link network. In particular, when the modified terminal functions as a transmitter, the modified terminal adds the clock offset value to a current network clock value. This causes transmitter communication hardware acting as a TDMA modem at the modified terminal to send data sooner than if network clock values are not used with the clock offset value. When the modified communication terminal is acting as a receiver, the clock offset value is subtracted from the current network clock value, resulting in the modem at the modified terminal being able to use TDMA received data at a time later than what would otherwise be possible if only the current network clock value were used.

Thus, certain embodiments are applied to communications timing between a space vehicle (e.g., a satellite) that moves relative to the earth (e.g., a low earth orbit satellite (LEO), a medium earth orbit satellite (MEO), or the like), on one hand, and a Link 16 (or other tactical data link) radio on the other hand. Although described herein as applicable to Link 16 radios, the descriptions can be applicable to other types of tactical data link radios.

Embodiments illustrated herein can be implemented using distances greater than the typical limits of Link 16 radios (e.g., about 300 nautical miles). Embodiments of the invention can track delays such that a Link 16 radio can transmit early and receive late. Embodiments can include adjustments for Doppler effects.

Figure 1:
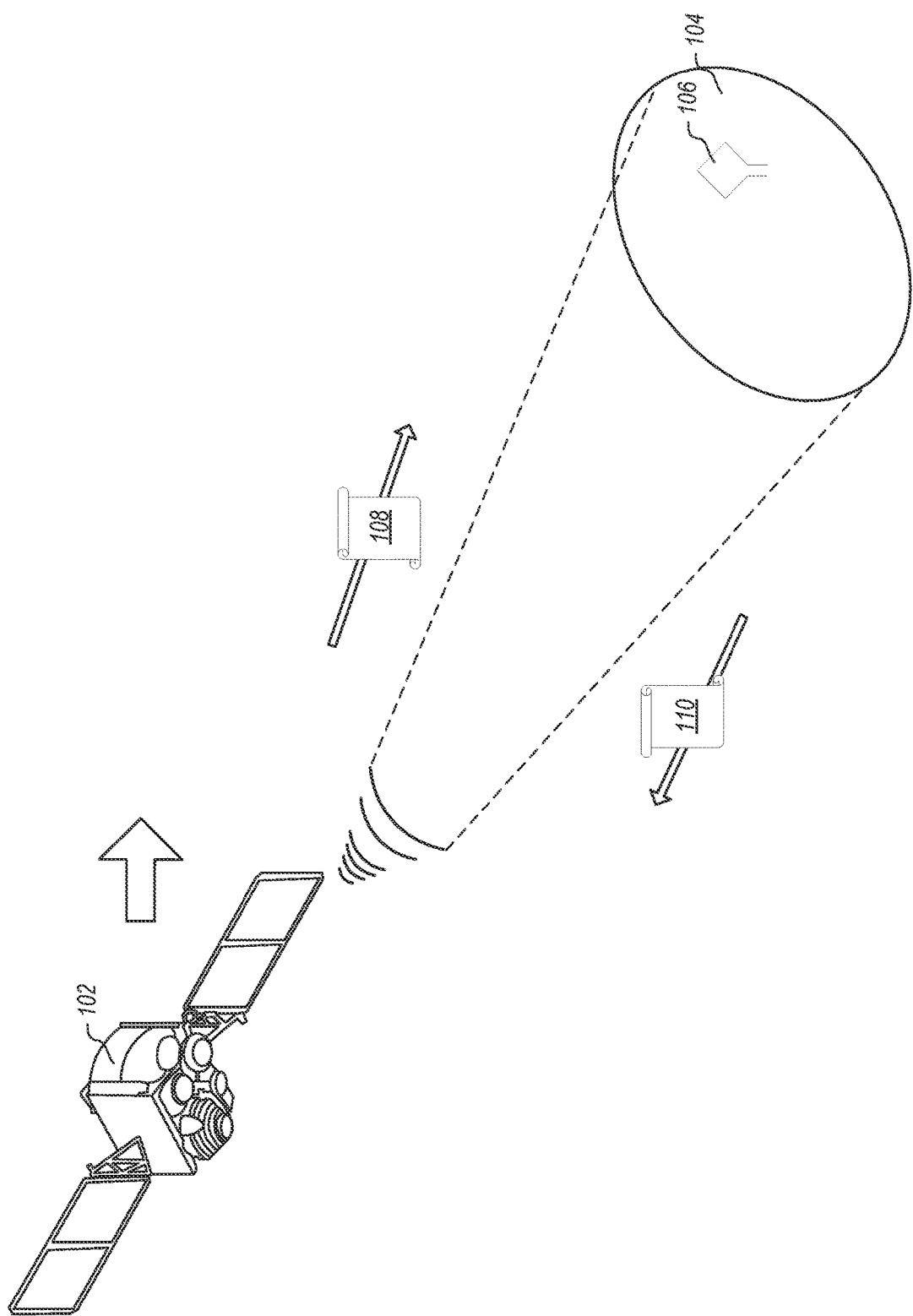
FIG. 1 illustrates a modified terminal communicating with a conventional terminal.

Referring now to FIG. 1, an example is illustrated. FIG. 1 illustrates a modified terminal 102. In this example, the modified terminal 102 is a satellite. The modified terminal communicates with terminals in an area of responsibility 104. The area of responsibility 104 is a fixed geographic area for which the modified terminal 102 will communicate with other terminals in the area of responsibility 104. For example, a 100 nmi$^2$ area represents a representative size of a typical area of responsibility.

The modified terminal 102 will vary in distance from the area of responsibility 104. Further, the modified terminal 102 will vary in the speed at which it approaches the area of responsibility 104. For example, when the modified terminal is on the horizon with respect to the area of responsibility 104, the modified terminal 102 will be both further from, and traveling faster towards the area of responsibility 104 than when the modified terminal 102 is directly over the area of responsibility 104. The modified terminal 102 communicates with a conventional terminal 106 in the area of responsibility 104. The modified terminal 102 uses a clock offset to communicate with the conventional terminal 106.

In the example illustrated, the modified terminal 102 has a high gain antenna. The modified terminal 102 also has information identifying where the modified terminal 102 is physically located. The modified terminal 102 also has information identifying speed and direction that the modified terminal 102 is traveling. The modified terminal 102 has information identifying the area of responsibility 104. Using the above information, the modified terminal 102 comprises computing hardware that calculates distance from the center of (or some other point within) the area of responsibility 104 and/or latency for communications to be transmitted to and/or received from the area of responsibility. Further, the modified terminal 102 can calculate the speed at which the modified terminal 102 is approaching the center of (or some other point within) the area of responsibility 104 and/or calculate a doppler effect due to the modified terminal 102 traveling towards a point in the area of responsibility 104.

Using the distance/latency and/or speed/doppler effect, hardware at the modified terminal 102 can compute an offset clock value which can be added to or subtracted from a system clock to modify how data is sent to and/or received from the conventional terminal 106. The transmit clock causes a terminal to run early, while the receive clock causes the terminal to run late. In particular, and with reference now to FIG. 2, for transmitting information, a transmit clock 252 has a value at any given time which is the value of the system clock 250 plus the offset clock value 254. Thus, the transmit clock 252 runs early as compared to the system clock 250. Transmit data 108 (see FIG. 1) is scheduled in a time slot 256 according to the transmit clock 252. This means that the transmit data 108 in the time slot 256 will be sent sooner than if the same transmit data 108 were scheduled for transmission according to the system clock 250. Further, when the transmit data 108 in the time slot 256 is sent, the modified terminal 102 configures the wireless communication hardware 258 according to the transmit clock 252, meaning that a first frequency (i.e., a modulated carrier frequency) in the FDMA scheme and first code is selected according to the transmit clock 252. Because the transmit data 108 is sent early, using the appropriate frequency and code for the earlier time (i.e., the first frequency and first code), the transmit data 108 has more time to reach the conventional terminal 106 before the conventional node changes to a frequency and code that is incompatible with the first frequency and first code. FIG. 3 illustrates aspects of the conventional terminal 106 which configures its communication hardware 358 according to the system clock 350, without an offset computed due to latency and/or doppler effect. Because the transmit data 108 is sent early, but using a frequency and code used by the conventional terminal 106 at a later point, the conventional terminal 106 is still able to receive and recover the transmit data 108.

Figure 2:
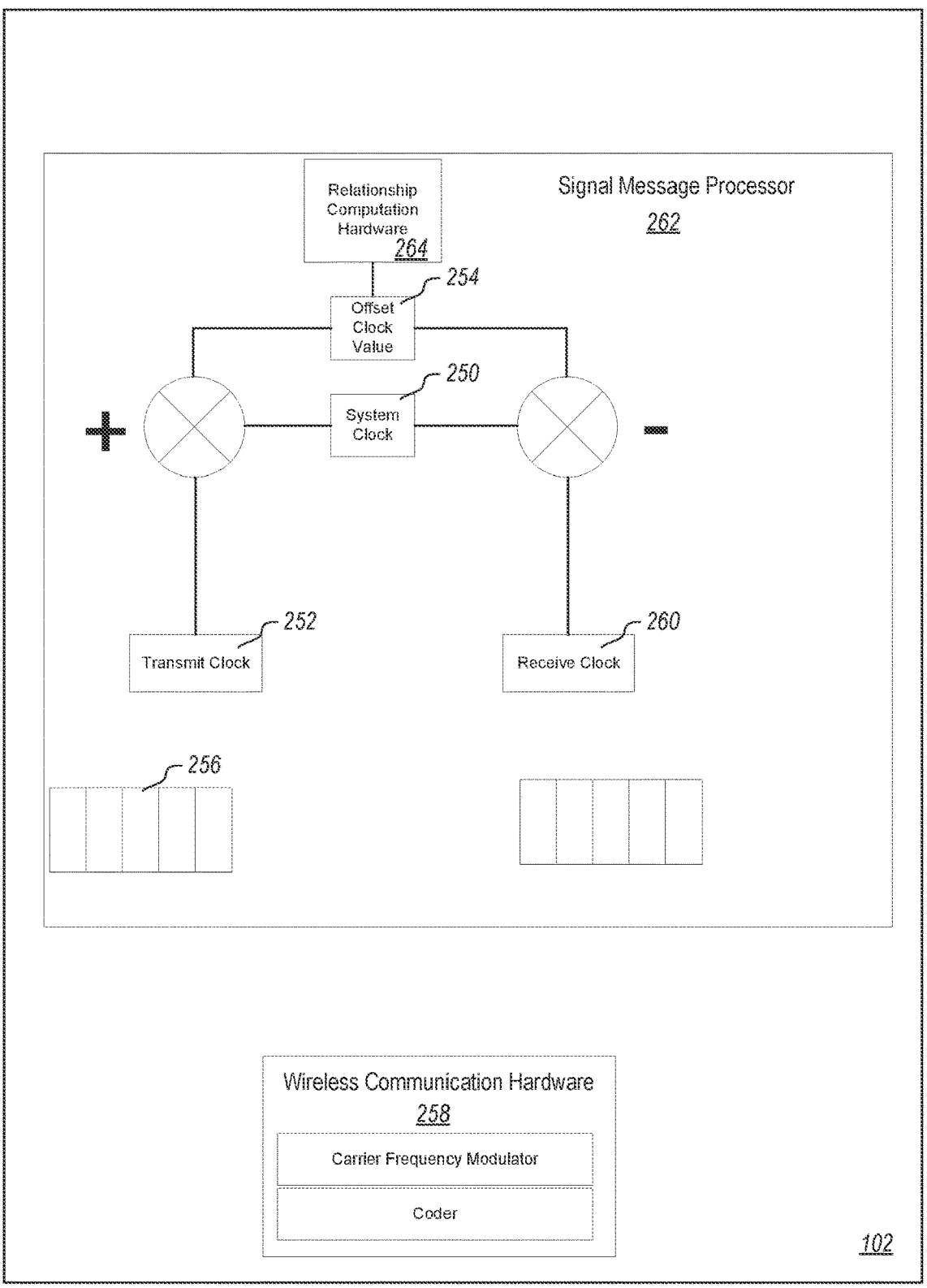
FIG. 2 illustrates additional details of the modified terminal.
Figure 3:
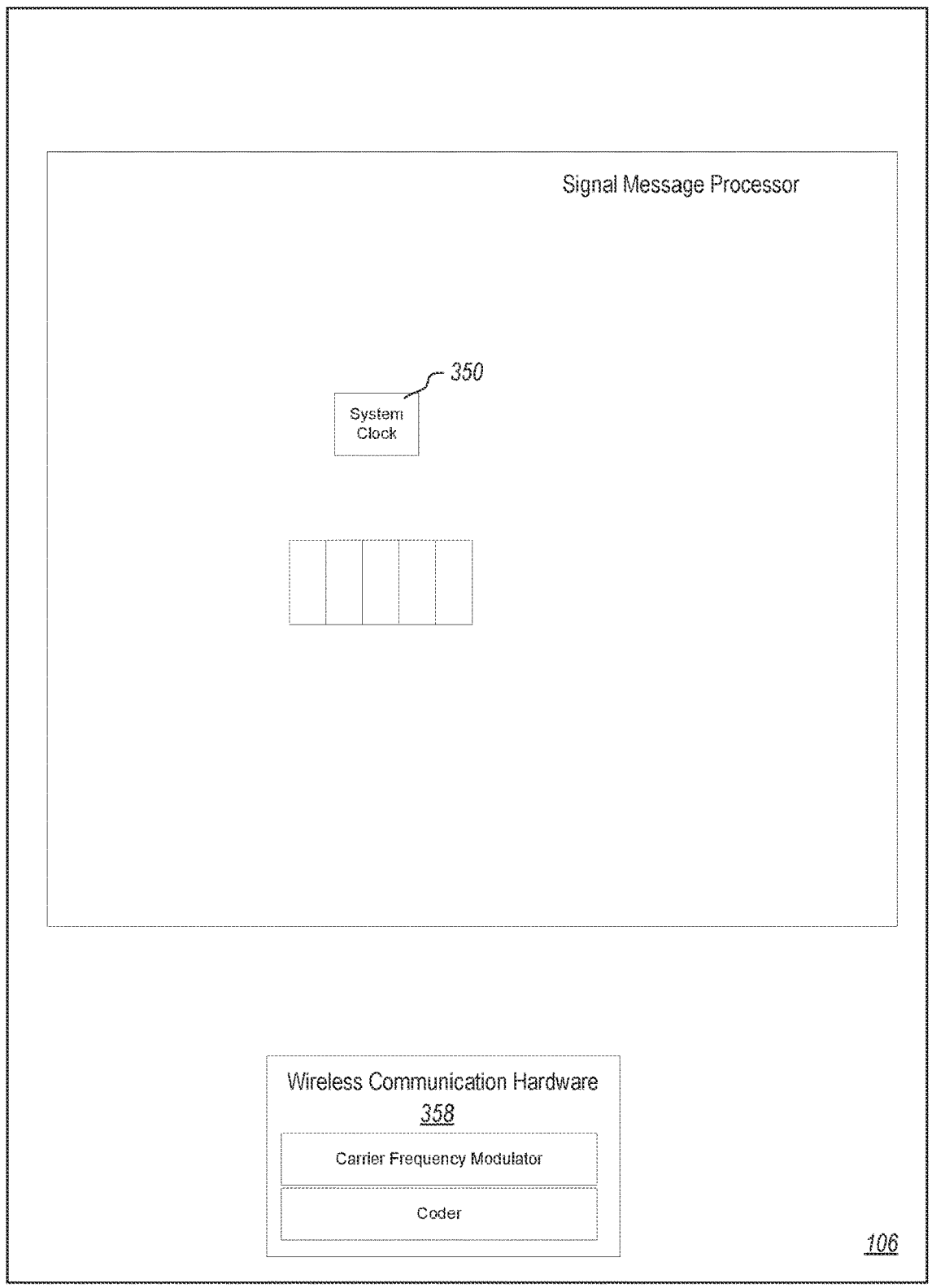
FIG. 3 illustrates additional details of the conventional terminal.

With respect to receive data 110 (See FIG. 1), the modified terminal 102 configures the wireless communication hardware 258 to be able to receive the receive data 110 at a time than would otherwise not be possible absent the receive clock 260 (see FIG. 2). In particular, the receive clock 260 has a value that is the offset clock value 254 subtracted from the system clock 250 value. The wireless communication hardware 258 is configured according to the receive clock 260 such that the frequency and coding are configured according to the receive clock. This allows for the modified terminal 102 to have the correct time relative to the propagation delay to receive the receive data 110 from the conventional terminal 106.

Additional details are now illustrated. A Link 16 terminal that is outside of an active Link 16 network performs various steps to enter the active Link 16 network, and to adjust or reset a current time reference at the outside terminal to synchronize with a time reference used by the network. An initial step is for the terminal that is outside of the active Link 16 network to detect an initial entry message that is transmitted periodically by one or more current members of the network. The TADIL-J format of the initial entry message is J0.0.

Once detected at the terminal, the initial entry message enables the terminal to determine the network time and to reset the terminal's current time to the network time plus the propagation delay to the receiving terminal. The initial entry message includes certain network operating information including a current default net number, typically zero (0). After entering the network, the terminal follows specified procedures to obtain fine time synchronization so that the terminal can exchange messages and otherwise participate in the network.

Wireless communication hardware configured as a receiver is configured to dwell on a determined set of frequencies until the wireless communication hardware detects a message preamble. Once a preamble is detected during a certain time slot, a message processor receives message data during the time slot. The message processor performs error correction and other functions on the data and supplies the processed data to a cryptographic subsystem. The cryptographic subsystem sends output to a Link 16 application processor. The application processor sends the decrypted message to a host computer, and/or processes the message data further depending on the message type. This process repeats for each time slot. With this general description of how data is received in a Link 16 system additional details are illustrated.

Network Host/Space Vehicle (SV) Inputs/Outputs

Navigation inputs and outputs are provided to and from the modified Link 16 terminal, such as a space vehicle, of a Link 16 network to support satellite or other communication timing. These inputs and outputs can be conveyed in functional input messages and functional output messages respectively, in accordance with a host interface specification. The data from input messages can be used to calculate propagation delay and rate of change from the modified terminal 102, in this case a space vehicle, to the Link 16 radios at other terminals, such as the conventional terminal 106, in the area of responsibility 104.

A functional input message-X conveys the current position of the modified terminal 102. A functional input message-X/Y conveys a center position (or other position) of the targeted area of responsibility 104 of the Link 16 network. A functional output message-X conveys the modified terminal's own position from its navigation solution. For example, the modified terminal 102 may have GPS hardware or other location hardware that provides location information. This location information may be embedded in the output message-X and included in Link 16 messages.

Link 16 Radio Initialization (Pre Net-Entry)

A Link 16 signal message processor 262, implemented using waveform programmable logic, has separate transmit and receive clocks 252 and 260 respectively, that the signal message processor 262 can adjust independently. The signal message processor 262 initializes these clocks to the same time base value using the system clock 250. Upon connection to the Link 16 network and reception of the functional input message-X/Y, Link 16 common software calculates the propagation delay (e.g., using known distances based on information in the input message-x and the input message-x/y) and rate-of-change (e.g., by calculating a speed determined by internal location and/or speed sensing and/or by using a series of input messages-x to determine differences in location over time) to/from the area of responsibility 104. These calculations can happen continually as updates of functional input message-x and input message-X/Y are received. Functional output message-X can be conveyed periodically upon connection to the Link 16 network.

Link 16 Network Entry

The wireless communication hardware attempts to enter the Link 16 network when commanded by the modified terminal. This may be as the result of programmatic instructions stored in physical computer readable media at the modified terminal being executed by one or more processors and/or resulting from control commands provided to the modified terminal from sources external to the modified terminal. The Link 16 common software can create a time slot-command for the next available initial entry slot. This time slot command is passed through any crypto and processed by the signal message processor 262. The signal message processor commands the programmable logic to start listening for a J0.0 network entry message. Upon receipt of a J0.0 the signal message, the signal message processor 262 creates a time slot-report and passes it through any crypto to the Link 16 common software. If the time slot-report is valid, the signal message processor declares synchronization. Up to this point, operations of the modified terminal 102 are similar or even identical to a conventional terrestrial Link 16 terminal, such as the conventional terminal 106.

Link 16 LEO Coarse Sync

To close the link and allow transmissions (i.e., fine sync) the modified terminal 102 can use a pseudo ranging method for timing refinement. Using the position of the modified terminal 102, position of a point in the area of responsibility 104, and received location and propagation information from terrestrial units, such as the conventional terminal 106, the Link 16 common software running on the relationship computation hardware 264 can build a time-model to accurately predict the start/end of each terrestrial time slot for conventional terminals in the Link 16 network. The start/end of each terrestrial time slot is adjusted by the time model as needed to account for time drift. Link 16 common software calculates a time offset (late in reference to the terrestrial network as determined using the system clock 250 for receiving messages) from the start/end of each terrestrial time slot by applying the propagation delay represented by the offset clock value 254, plus an adjustment to receive from terrestrial units in, for example, a 100 nmi$^2$ area of the area of responsibility. Link 16 common software can also calculate a time offset (early in reference to terrestrial network) from start/end of each terrestrial time slot by applying the propagation delay, plus an adjustment to transmit to terrestrial units in, for example, a 100 nmi$^2$ area of the area of responsibility 104. The timing offsets and the rate-of-change calculation are passed through a crypto bypass message to the signal message processor 262 every time slot command. The signal message processor processes the time slot command messages and adjusts the programmable logic transmit and receive clocks 252 and 260 respectively accordingly. The signal message processor can also have an interface to accept rate-of-change (corresponding to the speed of the modified terminal 102 with respect to a point in the area of responsibility 104) and apply any pulse by pulse Doppler corrections as needed. The signal message processor 262 continues to pass received messages via time slot-reports to Link 16 common software and applies any adjustments in a time slot command.

Link 16 Fine-Sync

Once the time-model is accurate to a predetermined threshold, fine-sync can be declared and transmission allowed. In some embodiments, the fine-sync threshold is significantly lower than a terrestrial threshold used by conventional terminals as the modified terminal will not be used as a navigational aid. The timing offsets and rate-of-change adjustments can continue to be calculated by Link 16 common software and applied by the signal message processor 262 to maintain the link. The signal message processor 262 handles the schedule of transmit opportunities and receive opportunities on their respective time-base including dropping receive opportunities to allow transmissions. That is, embodiments prioritize transmitting messages over receiving messages. This is done inasmuch as transmissions are performed by a given terminal for smaller portions of time than receiving. In particular, receiving is often performed 95 to 99% of the time.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
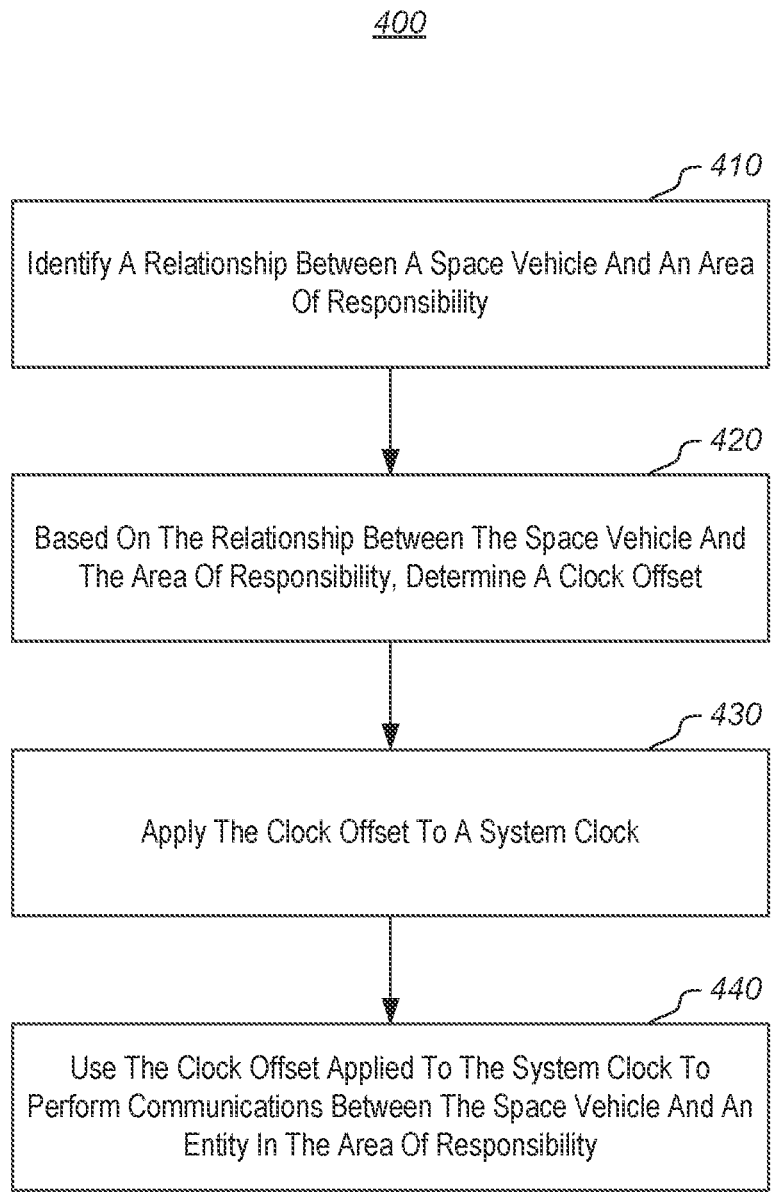
FIG. 4 illustrates a method of communicating using a tactical radio in a space vehicle environment.

Referring now to FIG. 4, a method 400 is illustrated. The method 400 includes acts for communicating using a tactical radio in a space vehicle environment. The method 400 includes identifying a relationship between a space vehicle and an area of responsibility (act 410). The area of responsibility is a predetermined area that the space vehicle beams communications to having intended terminals in the predetermined area. Identifying a known relationship may be based on using GPS at the space vehicle and known location of the area of responsibility. Alternatively or additionally, identifying a known relationship may be based on sending a message and calculating a delay response. Alternatively or additionally, identifying a known relationship may be based on sending a doppler signal from the space vehicle to a location in the area of responsibility. Etc.

The method 400 further includes, based on the relationship between the space vehicle and the area of responsibility, determining a clock offset (act 420).

The method 400 further includes applying the clock offset to a system clock (act 430).

The method 400 further includes using the clock offset applied to the system clock to perform communications between the space vehicle and an entity in the area of responsibility (act 440).

The method 400 may be practiced where the relationship comprises a propagation delay from the space vehicle to the area of responsibility. In some embodiments, the propagation delay may be determined by using a known distance from the space vehicle to the area of responsibility.

The method 400 may be practiced where the relationship comprises a rate of change of propagation delay from the space vehicle to the area of responsibility. In some embodiments, the rate of change of propagation delay may be determined by using a speed of the space vehicle with respect to the area of responsibility, to account for Doppler effects.

The method 400 may be practiced where the space vehicle is functioning as a receiver. In this example, using the clock offset applied to the system clock includes subtracting the clock offset from the system clock.

The method 400 may be practiced where the space vehicle is functioning as transmitter. In this example, using the clock offset applied to the system clock includes adding the clock offset to the system clock.

The method 400 may be practiced where using the clock offset applied to the system clock to perform communications between the space vehicle and an entity in the area of responsibility includes selecting a spreader code based on the clock offset applied to the system clock.

The method 400 may be practiced where using the clock offset applied to the system clock to perform communications between the space vehicle and an entity in the area of responsibility comprises selecting a carrier frequency modulation based on the clock offset applied to the system clock.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of communicating using a tactical radio in a space vehicle environment, the method comprising:
    identifying a relationship between a space vehicle and an area of responsibility;
    based on the relationship between the space vehicle and the area of responsibility, determining a clock offset;
    applying the clock offset to a system clock; and
    using the clock offset applied to the system clock to perform communications between the space vehicle and an entity in the area of responsibility.

2. The method of claim 1, wherein the relationship comprises a propagation delay from the space vehicle to the area of responsibility.

3. The method of claim 1, wherein the relationship comprises a rate of change of propagation delay from the space vehicle to the area of responsibility.

4. The method of claim 1, wherein the space vehicle is functioning as a receiver, and wherein using the clock offset applied to the system clock comprises subtracting the clock offset from the system clock.

5. The method of claim 1, wherein the space vehicle is functioning as a transmitter, and wherein using the clock offset applied to the system clock comprises adding the clock offset to the system clock.

6. The method of claim 1, wherein the tactical radio comprises a Link 16 radio.

7. The method of claim 1, wherein using the clock offset applied to the system clock to perform communications between the space vehicle and an entity in the area of responsibility comprises selecting a spreader code based on the clock offset applied to the system clock.

8. The method of claim 1, wherein using the clock offset applied to the system clock to perform communications between the space vehicle and an entity in the area of responsibility comprises selecting a carrier frequency modulation based on the clock offset applied to the system clock.

9. A tactical radio terminal comprising:
    a system clock configured to keep track of network time for a tactical network;
    relationship computation hardware configured to:
        identify a relationship between a space vehicle and an area of responsibility; and
        based on the relationship between the space vehicle and the area of responsibility, determine a clock offset;
    a transmit clock or receive clock comprising the clock offset applied to a value of the system clock; and
    a signal message processor configured to use the transmit clock or the receive clock to perform communications between the tactical radio terminal and an entity in the area of responsibility.

10. The tactical radio terminal of claim 9, wherein the relationship comprises a propagation delay from the space vehicle to the area of responsibility.

11. The tactical radio terminal of claim 9, wherein the relationship comprises a rate of change of propagation delay from the space vehicle to the area of responsibility.

12. The tactical radio terminal of claim 9, wherein the receive clock comprises the clock offset applied to the system clock by subtracting the clock offset from the system clock.

13. The tactical radio terminal of claim 9, wherein the transmit clock comprises the clock offset applied to the system clock by adding the clock offset to the system clock.

14. The tactical radio terminal of claim 9, wherein the tactical radio terminal comprisesا Link 16 radio terminal.

15. The tactical radio terminal of claim 9, further comprising wireless communication hardware configured to use a spreader code based on the transmit clock or the receive clock.

16. The tactical radio terminal of claim 9, further comprising wireless communication hardware configured to use a frequency modulation based on the transmit clock or the receive clock.

17. A computer system comprising:
one or more processors; and
one or more non-transitory computer-readable media having stored thereon instructions that are executable by the one or more processors to configure the computer system to communication using a tactical radio in a space vehicle, including instructions that are executable to configure the computer system to perform at least the following:
identify a relationship between a space vehicle and an area of responsibility;
based on the relationship between the space vehicle and the area of responsibility, determine a clock offset;
apply the clock offset to a system clock; and
use the clock offset applied to the system clock to perform communications between the space vehicle and an entity in the area of responsibility.

18. The computer system of claim 17, wherein the relationship comprises a propagation delay from the space vehicle to the area of responsibility.

19. The computer system of claim 17, wherein the relationship comprises a rate of change of propagation delay from the space vehicle to the area of responsibility.

20. The computer system of claim 17, wherein the space vehicle is functioning as a receiver, and wherein using the clock offset applied to the system clock comprises subtracting the clock offset from the system clock.

* * * * *